(12) United States Patent
Del Estal Villar

(10) Patent No.: US 7,342,487 B2
(45) Date of Patent: Mar. 11, 2008

(54) AUTOMATIC SIGNALING DEVICE FOR AUTOMOBILES

(76) Inventor: Jose Maria Del Estal Villar, C/Isabel Serrano, 9, E 28029 Madrid (ES)

( * ) Notice: Subject to any disclaimer, the term of this patent is extended or adjusted under 35 U.S.C. 154(b) by 173 days.

(21) Appl. No.: 10/474,409

(22) PCT Filed: Apr. 5, 2002

(86) PCT No.: PCT/ES02/00169

§ 371 (c)(1),
(2), (4) Date: Oct. 8, 2003

(87) PCT Pub. No.: WO02/081261

PCT Pub. Date: Oct. 17, 2002

(65) Prior Publication Data

US 2004/0090313 A1    May 13, 2004

(30) Foreign Application Priority Data

Apr. 9, 2001    (ES)    ............................ 200100904 U

(51) Int. Cl.
*B60Q 1/52* (2006.01)
(52) U.S. Cl. ..................... 340/471; 340/475; 340/468; 340/463; 340/465

(58) Field of Classification Search ................ 340/468, 340/471, 475, 483, 488, 464–466, 470, 477, 340/479; 362/487
See application file for complete search history.

(56) References Cited

U.S. PATENT DOCUMENTS

| 4,831,357 A | * | 5/1989 | Miller | 340/472 |
| 5,473,306 A | * | 12/1995 | Adell | 340/468 |
| 5,763,925 A | * | 6/1998 | Hsu | 257/390 |
| 6,002,330 A | * | 12/1999 | Brandt | 340/468 |
| 6,236,311 B1 | * | 5/2001 | Anderson | 340/468 |

FOREIGN PATENT DOCUMENTS

GB    2186131    1/1987

* cited by examiner

*Primary Examiner*—Benjamin C. Lee
*Assistant Examiner*—Travis Hunnings
(74) *Attorney, Agent, or Firm*—Lackenbach Siegel, LLP

(57) ABSTRACT

The device automatically actuates the vehicle emergency lights when the brake pedal and one of the turn signals are simultaneously used. To do so it uses an integrated circuit that actuates a periodic pulsating signal in its outputs when a continuous signal is received in its inputs that comes from the brake pedal switch, and, at the same time, a pulsating signal from one of the turn signals. The device is especially indicated for warning that a dangerous maneuver with left or right turns is going to be performed on two-way highways, for example.

5 Claims, 1 Drawing Sheet

AUTOMATIC SIGNALING DEVICE FOR AUTOMOBILES

OBJECT OF THE INVENTION

The present invention refers to an automatic signaling device for automobiles, which provides essential novelty features and significant advantages regarding the means, which are known and used for similar purposes in the current state of the art.

More specifically, the invention develops a device by means of which it is possible for the driver of a vehicle to carry out a complete signally indication when he is going to perform a left or right turns, indicating to the other drivers circulation on the same road, to prevent confusion or errors that may give way to inopportune and unwanted accidents. The warning indications are carried out with the light elements incorporated by the vehicle itself.

The field of application of the present invention is comprised within the industrial sector dedicated to manufacturing and/or installing auxiliary elements for the automotive industry in general, and more specifically signaling and safety devices for automotive vehicles.

BACKGROUND AND SUMMARY OF THE INVENTION

It is generally well known by everyone that many collisions and accidents occurring daily are caused either by poor signaling by the drivers or by an erroneous interpretation, distraction or lack of vision of other drivers and/or pedestrians.

Specifically, an especially dangerous maneuver, especially on by-ways and local highways where there is only one lane for each direction of travel, and which are also performed daily by a great number of drivers, consists of making a turn towards the left or right on a road of this type from the central part or median of said highway. In this particular case, what the driver does is indicate that he is going to make a turn by means of the turn signal, and furthermore, he needs to step on the brake pedal to reduce speed, a consequence of which is that the rear brake light lights up.

However, said situation may lead to states of confusion for both the driver coming from straight ahead and for the driver following him, as explained below:

The driver behind he who is going to perform said maneuver may interpret that the driver is going to pass someone upon seeing the turn signal, he therefore does not reduce his speed, which can evidently lead to a situation in which a collision occurs. Furthermore, the brake light has a greater intensity than the turn signal, which on occasions may cause the latter not to be seen, such that the driver from behind does not know how to interpret that the preceding vehicle is going to perform the turn maneuver.

On the other hand, the driver coming from straight ahead to whom the turn is indicated only sees the turn signal light, he may therefore become disoriented by not knowing if the maneuver is going to consist of passing or making a turn, which may cause unforeseen reactions.

A possible solution to signal this type of maneuver consists of, in addition to actuating the turn signal and stepping on the brake, actuating the emergency indicator at time intervals, the purpose of which is to warn that an abrupt stop or halt is going to be carried out. In this manner, both the driver from behind and the driver coming from straight ahead are capable of interpreting the intentions of the driver of the vehicle turning to the left or right.

However, the solution provided is not completely safe, since the driver must release the steering wheel to manually actuate both the turn signal and the emergency lights, and he must even distract his view from the road in a situation when it is not recommendable to do so.

As a result of all that has been previously explained, and for the purpose of preventing, as much as possible, the high number of traffic accidents occurring for the reasons explained, among others, the present invention proposes an automatic signaling device for all types of automobiles on the market, which permits unmistakably warning of the need to perform turning maneuvers which imply a certain risk, without the need to remove the hands from the steering wheel.

Basically, the signaling device consists of automatically actuating the emergency lights when it coincides that a turn signal and the brake are being simultaneously used.

In order to carry this out, the device of the present invention proposes the design of a control unit, fed by the car battery, which has three inputs and multiple outputs.

The basic functioning consists of when the control unit detects two signals in two of its inputs, a continuous and another alternating or pulsating, for example a square signal simultaneously for a determined period of time, it generates a signal sequence of identical duration in its outputs during another determined time, after which time it checks if the inputs are still active, identically repeating the sequence in the affirmative case.

In this manner, it is enough to duly connect the signals, which are generated when the driver of the vehicle actuates a turn signal and steps on the brake to the corresponding inputs in the control unit, and to connect its outputs to the device generating the emergency signal in question.

BRIEF DESCRIPTION OF THE DRAWINGS

These and other features and advantages of the invention will become more clearly evident from the detailed description that follows of a preferred embodiment of the invention, given only as an illustrative and non-limiting example, with reference to the attached drawings, wherein.

DESCRIPTION OF THE PREFERRED EMBODIMENT OF THE INVENTION

Figure 1:
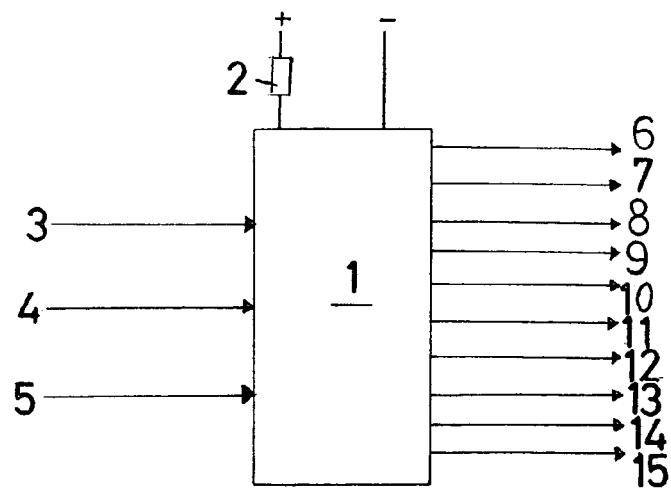
FIG. 1 shows an electric scheme of the automatic signaling device for vehicles.

In order to carry out the detailed description that follows of the preferred embodiment of the present invention, permanent reference will be made to the figures in the drawings, through which the same numerical references have been used for the equal or similar parts. Thus, first considering FIG. 1, the automatic signaling device for automobiles consists of a preferably integrated type control unit (1) fed by the battery of the automotive vehicle through a protection device (2) of the unit, such as a limiting resistance or another suitable means, which provides the suitable working voltage, said control unit (1) having a number of input connections, preferably three inputs (3-5), and a plurality of output connections, preferably the outputs indicated by means of the references (6-15).

In said unit, two inputs (3,4) have been connected to respective devices susceptible to feeding each one of them a continuous signal when they are actuated, at a voltage level that is preferably comprised between 6 and 24 volts (or any other voltage that could be posed on the future), whereas the third input (5) has been connected to a device such that, when it is active, it provides a pulsating signal, preferable a square wave, whose maximum voltage value is also comprised between 6 and 24 volts (or another suitable voltage).

Figure 2:
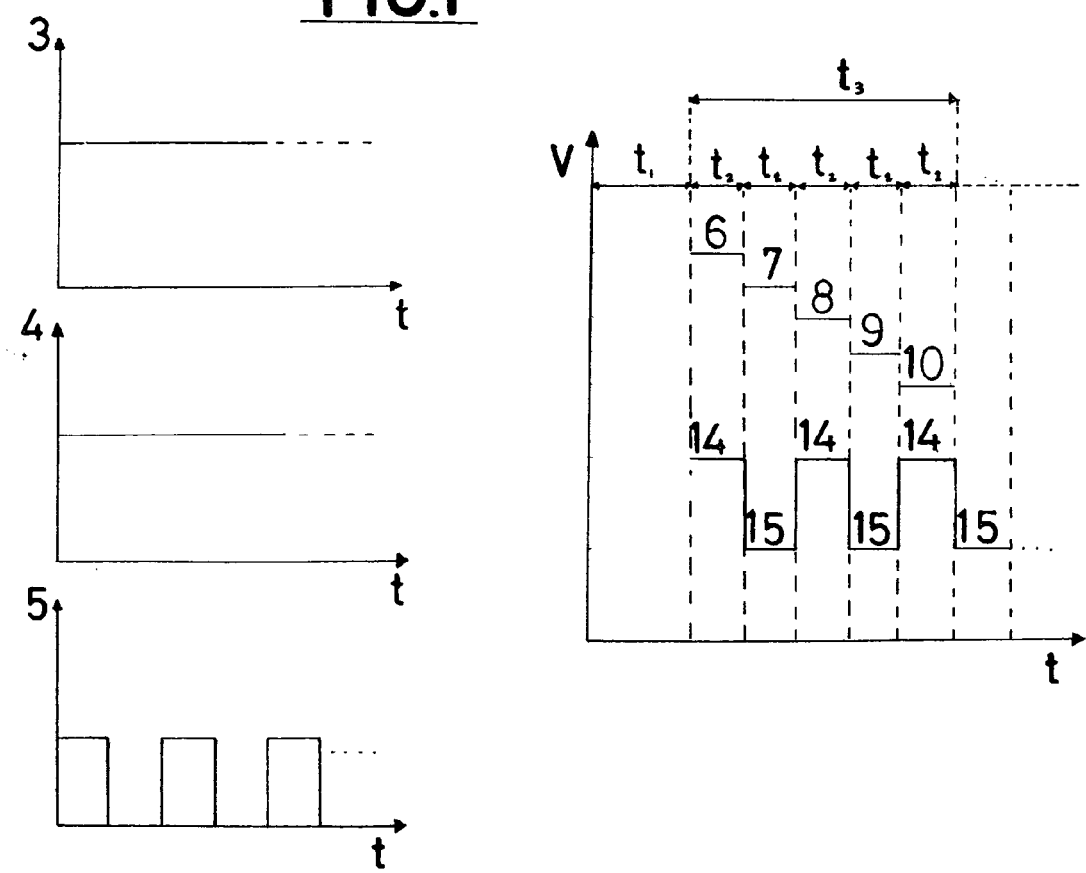
FIG. 2 shows the diagrams of the times of the electric signals intervening in the signaling device in the previous figure.

In this manner, when the control unit (1) detects that a continuous signal input and the input receiving said square signal are both simultaneously active and for a predetermined time (t1), it generates a sequence of signals of identical duration (t2) in its outputs (6-15) for another predetermined time (t3), such as graphically shown in FIG. 2.

Once the time (t3) has lapsed corresponding to the duration of the output sequence, the control unit (1) checks if the inputs (3, 5) or (4, 5) are still active, and the sequence is cyclically repeated whenever the condition that one be continuous and the other square is complied with.

All said times (t1, t2, t3) can be varied, depending on the needs of the driver or the manufacturer, by means of potentiometers or other regulation and adjustment devices.

Lastly, said outputs (5-16) of the control unit are connected to the vehicle devices actuating the different emergency lights, by means of either a direct connection or through other feeding devices.

It is not considered necessary to further extend the content of this description so that a skilled person in the art can understand its scope and the advantages derived from the invention, as well as to develop and carry out the object thereof.

Nonetheless, it should be understood that the invention has been described according to a preferred embodiment thereof, it may therefore be susceptible to amendments without this at all affecting the functioning of said invention, such amendments being possible to particularly affect the shape, size and/or materials used.

The invention claimed is:

1. A device for automatically actuating an emergency indicator with actuation of a turn signal and depressing the foot brake comprising:
    (a) at least one emergency indicator;
    (b) a first unit comprising means for providing a first signal consisting of a continuous wave signal;
    (c) a second unit comprising means for providing a second signal consisting of a pulsating square signal; and in combination with,
    (d) a control unit (1) comprising:
        (i) means for inputting the first signal to the control unit;
        (ii) means for inputting the second signal to the control unit; and
        (iii) means for automatically actuating the emergency indicator with simultaneously active said first and second signals, and absent actuation of at least one of wipers and fog lights;
    said control unit comprises means for receiving a continuous voltage from the automobile vehicle, said control unit comprising three inputs (3,6,5) (3 to 5) and a plurality of outputs (6 to 15), said inputs (3 to 5) having means for receiving continuous and pulsating square wave signals, for actuating the control unit (1) to automatically actuate said emergency indicator,
    further characterized in that two inputs (3, 4) receive continuous level signals, whereas the other input (5) receives a pulsating, square wave signal, these input signals being generated independently of said control unit (1), such that the response of the unit through said outputs (6 to 15) occurs when only one continuous signal is fed through the corresponding said two inputs (3, 4), simultaneously with the pulsating signal through the respective said other input (5),
    further comprising means for operably connecting the vehicle turn signals to said second unit, and means for operably connecting the front brake to said first signal;
    whereby when the control unit (1) detects the one continuous signal and the input (5) receives said pulsating square wave signal, and wherein with both said signals the energizing indicator is automatically actuated with actuation of the turn signal and depression of the foot brake only.

2. The system of claim 1, characterized in that the outputs (6 to 15) are activated according to predetermined time intervals ($t_2$), constituting a repetitive sequence of a pre-established duration ($t_3$).

3. The system of claim 1, wherein the turn signals are integral operably disposed vehicle components.

4. The device of claim 1, further comprising wipers and fog lights, and wherein at least one of said wipers and fog lights being inoperably disposed with said means for automatically actuating the emergency indicator, without actuation of either the wipers or fog lights.

5. The device of claim 1, further comprising wipers and fog lights and wipers and fog lights being inoperably disposed with said means for automatically actuating the emergency indicator, without actuation of either the wipers or fog lights.

* * * * *